(12) United States Patent
Tamura

(10) Patent No.: US 8,363,896 B2  
(45) Date of Patent: Jan. 29, 2013

(54) WHITE ROAD LINE RECOGNITION DEVICE FOR VEHICLE

(75) Inventor: Yuichiro Tamura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 319 days.

(21) Appl. No.: 12/858,129

(22) Filed: Aug. 17, 2010

(65) Prior Publication Data

US 2011/0052079 A1    Mar. 3, 2011

(30) Foreign Application Priority Data

Aug. 31, 2009  (JP) .................................. 2009-200571

(51) Int. Cl.
*G06K 9/00*    (2006.01)
*G06K 9/48*    (2006.01)

(52) U.S. Cl. .......................... 382/103; 382/104; 382/199

(58) Field of Classification Search .................. 382/103, 382/104, 106, 108, 199, 270
See application file for complete search history.

(56) References Cited

U.S. PATENT DOCUMENTS

2007/0084655 A1* 4/2007 Kakinami et al. ............ 180/167

FOREIGN PATENT DOCUMENTS

JP    2007-264955    10/2007

* cited by examiner

*Primary Examiner* — Brian Le
(74) *Attorney, Agent, or Firm* — Smith, Gambrell & Russell, LLP

(57) ABSTRACT

The stereo image recognition device detects a first white road line starting point by luminance change on retrieval lines in a first white road line detection region set on an image, calculates an approximation line for a point group of the points, sets white road line search lines inside the approximation line in the vehicle width direction, and searches a white road line inside thereof based on luminance information on the search lines. When there is a white road line, the device sets a second white road line detection region by expanding the first region toward inside in the vehicle width direction, detects a second white road line starting point not overlapping the first point, calculates a white road line based on a point group of the first points or the second points selected on a predetermined condition, and sets the first region based on the calculated line.

5 Claims, 9 Drawing Sheets

DIRECTION OF EDGE DETECTION
FOR LEFT WHITE ROAD LINE

DIRECTION OF EDGE DETECTION
FOR RIGHT WHITE ROAD LINE

DIRECTION OF EDGE DETECTION
FOR LEFT WHITE ROAD LINE

DIRECTION OF EDGE DETECTION
FOR RIGHT WHITE ROAD LINE

← DIRECTION OF EDGE DETECTION FOR LEFT WHITE ROAD LINE   → DIRECTION OF EDGE DETECTION FOR RIGHT WHITE ROAD LINE

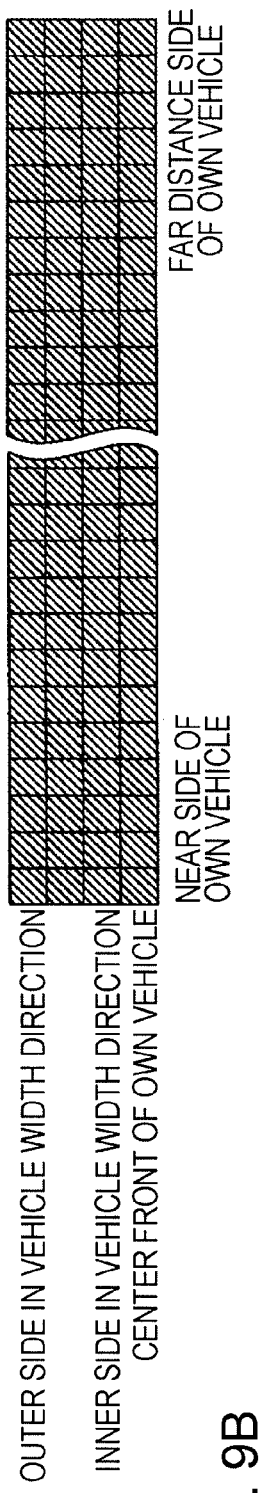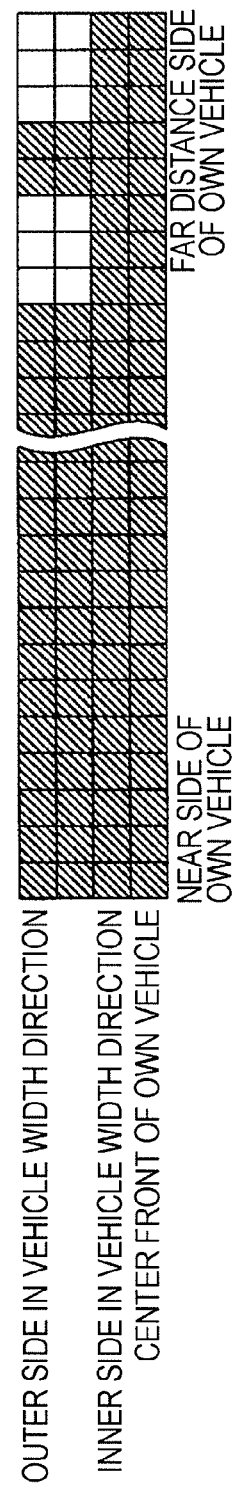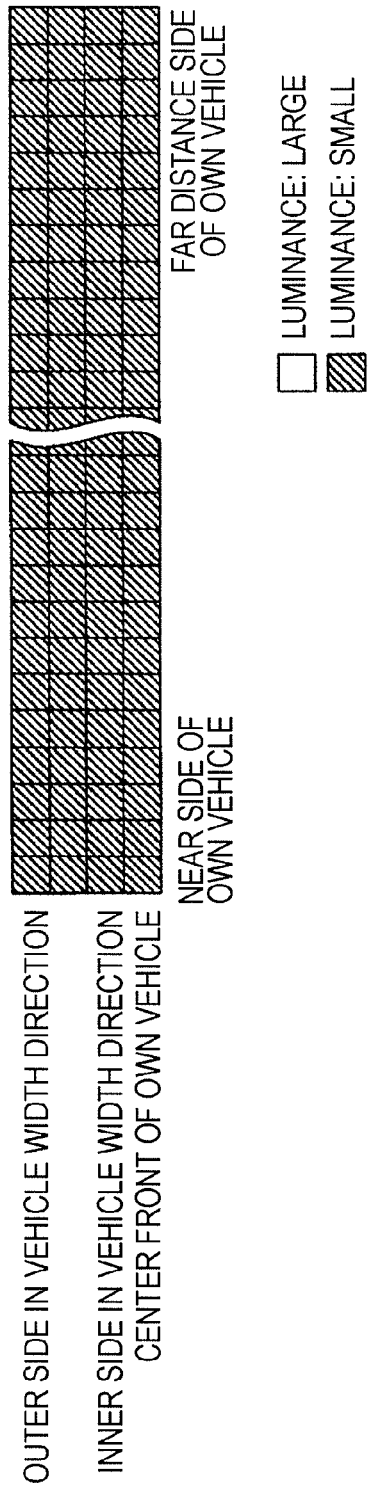

US 8,363,896 B2

WHITE ROAD LINE RECOGNITION DEVICE FOR VEHICLE

CROSS REFERENCES TO RELATED APPLICATIONS

The present application claims priority from Japanese Patent Application No. 2009-200571 filed on Aug. 31, 2009, and is hereby incorporated by reference in its entirety.

BACKGROUND OF THE INVENTION

1. Field of the Invention

The present invention relates to white road line recognition devices for vehicles that recognize white road lines based on images captured by an onboard camera.

2. Description of the Related Art

For the improvement of vehicle safety, driving support devices have recently been developed that actively support driver's operations. In order to achieve a function such as lane deviation prevention, a driving support device generally recognizes a white road line based on a captured image in front of an own vehicle, and the like, and makes an estimation on an own lane based on the captured white road line.

There are many types of actual white road lines besides on a white road line comprised of a single lane division line, such as a double white road line having a dashed line for visual guidance or the like inside the lane division line.

Therefore, upon the recognition of the white road line of this type, it is necessary to adequately consider the visual guidance line or the like in addition to the lane division line. Japanese Unexamined Patent Application Publication No. 2007-264955 (hereunder referred to as "Patent Document 1") discloses a technology that recognizes such a white road line. The technology first recognizes a road surface based on distance information that is obtained by processing of a pair of images. Among pixels on the recognized road surface the technology then detects a pixel whose luminance and differential value thereof are equal to or exceed a set threshold as a white road line point candidate. The technology then groups together the white road line point candidates within a certain distance. When more than a predetermined number of groups are detected and a length in the distance direction in real space of each detected group and the like falls within a predetermined value, the technology detects these groups as a dashed line put on the road surface.

However, the technology disclosed in Patent Document 1 requires an accurate value of the length of the inner visual guidance line, the interval thereof, the road width and the like, and thus a complicated calculation process.

SUMMARY OF THE INVENTION

The present invention is made in view of the above, and it is an object of the present invention to provide a white road line recognition device for vehicles that performs accurate and stable white road line recognition even for a double white road line and the like, using a simple and fast calculation process.

A white road line recognition device for vehicles according to an embodiment of the present invention includes first edge detecting means that detects a first edge point in a first white road line detection region set on a captured image of driving environment of an own vehicle, based on the change in luminance in the horizontal direction; approximation line calculation means that calculates an approximation line of a point group containing the first edge points; white road line searching means that sets a white road line search line along the approximation line on the inner side of the approximation line in the vehicle width direction and searches a white road line on the inner side of the approximation line in the vehicle width direction based on luminance information on the white road line search line; second detection region setting means that sets a second white road line detection region by expanding the first white road line detection region to the inner side in the vehicle width direction when it is determined that there is another white road line inside the approximation line in the vehicle width direction; second edge point detecting means that detects a point which does not overlap the first edge point among the white road line edge points detected in the second white road line detection region based on the change in luminance in the horizontal direction; white road line calculating means that selects either a point group containing the first white road line edge points or a point group containing the second white road line edge points based on a predetermined condition, and calculates a white road line based on the selected point group; and first detection region setting means that sets the first white road line detection region based on the calculated white road line.

According to an aspect of the present invention, the white road line recognition device for vehicles can perform accurate and stable white road line recognition even for a double white road line and the like, using a simple and fast calculation process.

BRIEF DESCRIPTION OF THE DRAWINGS

FIG. 9A through FIG. 9C are an illustrative view showing luminance on the white road line search lines for detecting a double white road line on each captured image;

DESCRIPTION OF THE PREFERRED EMBODIMENTS

Figure 1:
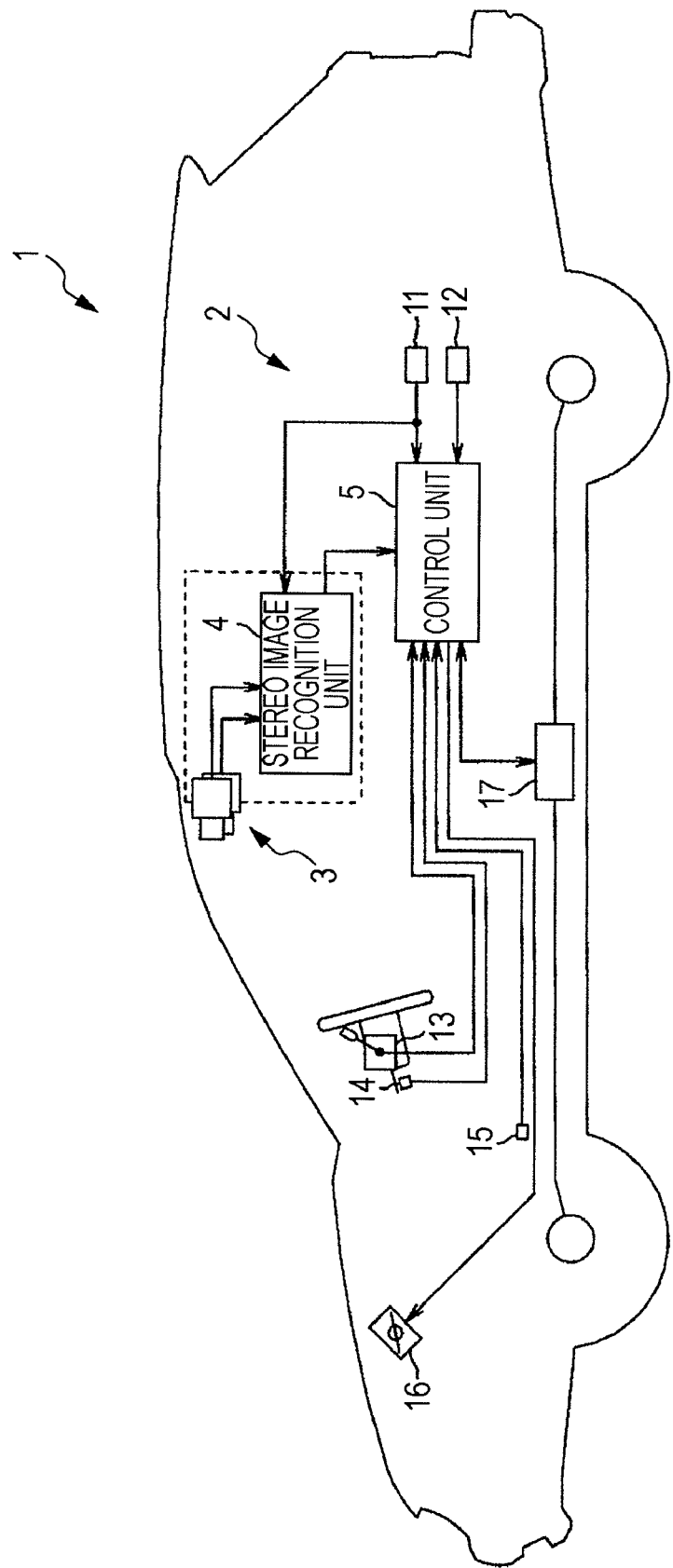
FIG. 1 is a general schematic view illustrating a driving support device for vehicles according to an embodiment of the present invention.
Figure 2:
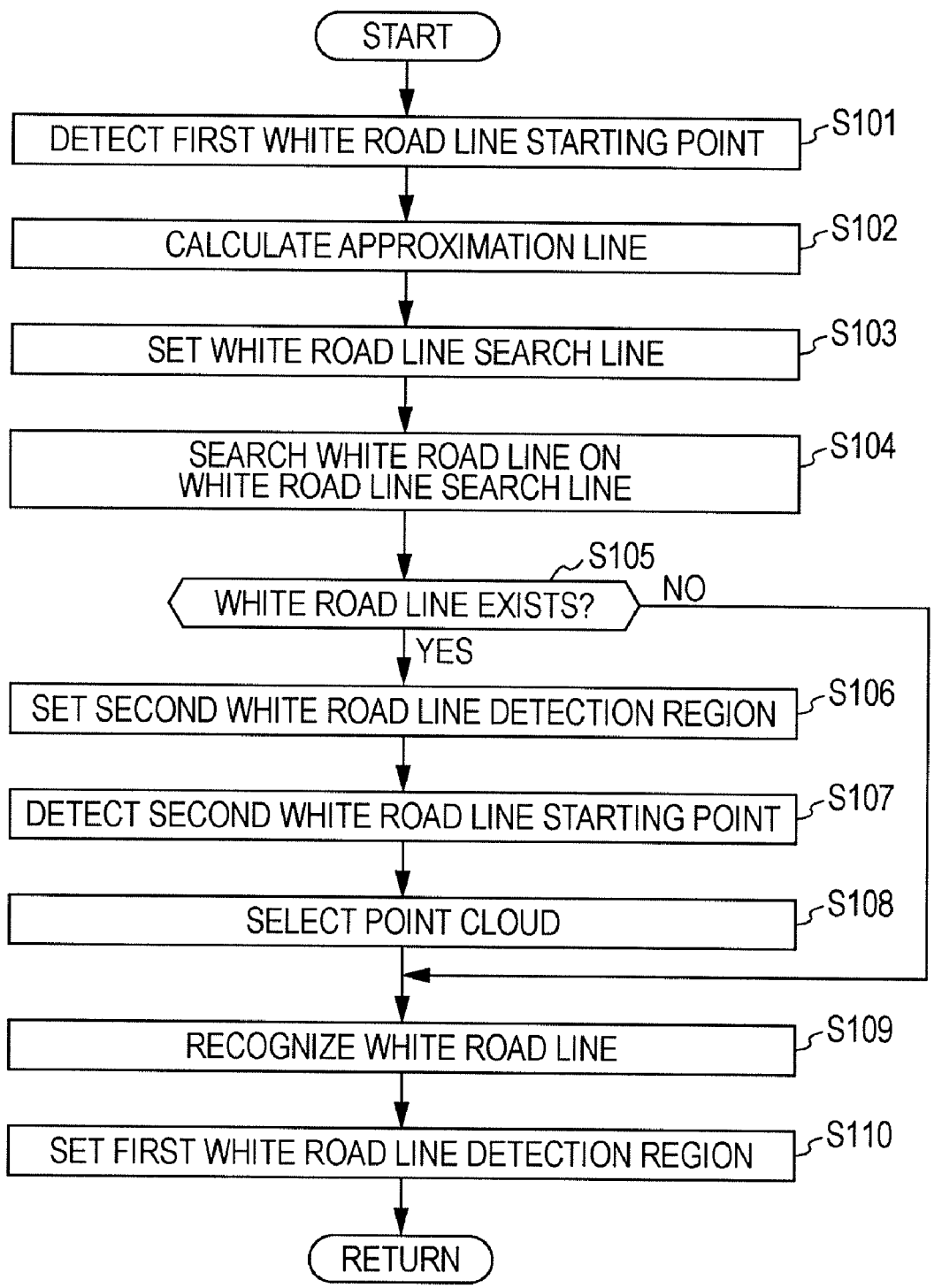
FIG. 2 is a flow chart showing a routine of white road line recognition.
Figure 3A:
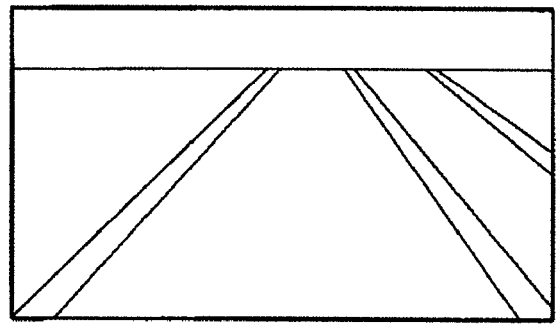
FIG. 3A is an illustrative view showing a frame format of a captured image of a vehicle exterior environment.
Figure 3B:
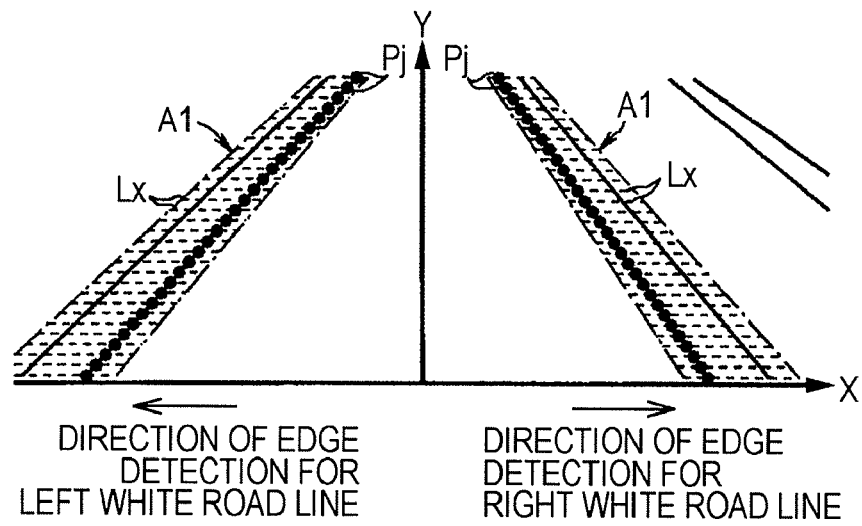
FIG. 3B is an illustrative view showing a first point group containing white road line starting points that are detected from the image of FIG. 3A.
Figure 3C:
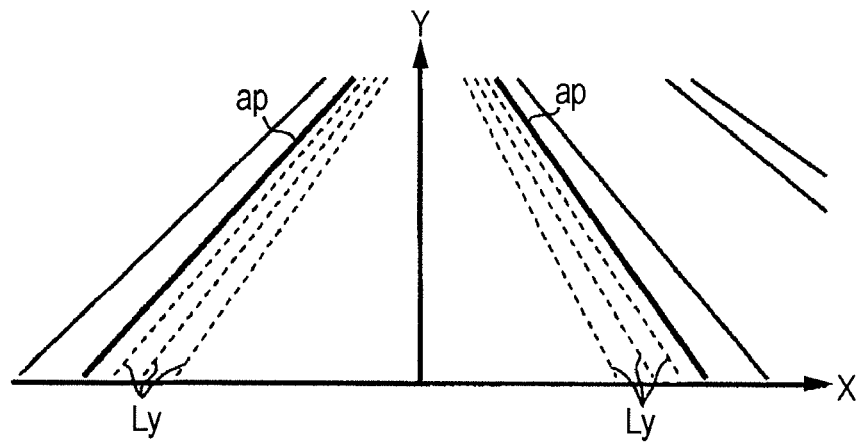
FIG. 3C is an illustrative view showing white road line search lines for detecting a double white road line.
Figure 4A:
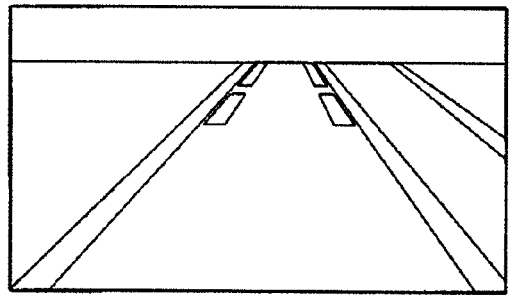
FIG. 4A is an illustrative view showing a frame format of a captured image of a vehicle exterior environment.
Figure 4B:
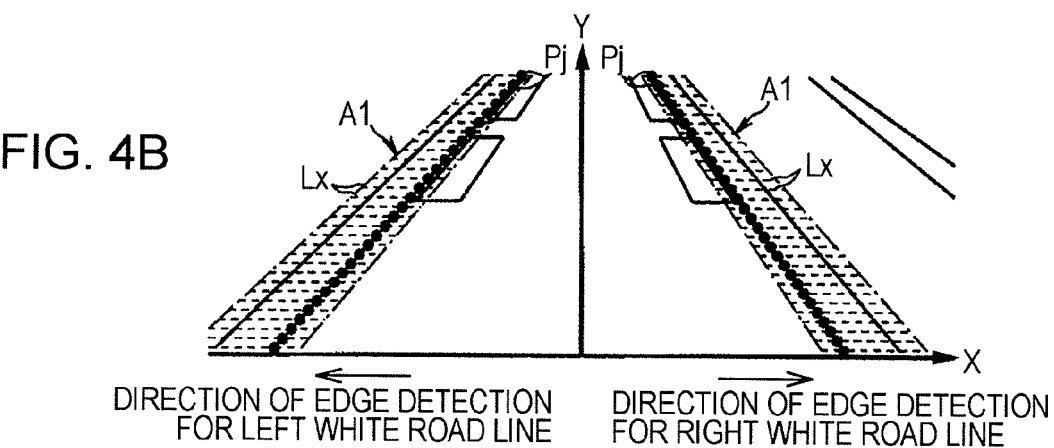
FIG. 4B is an illustrative view showing a first point group containing white road line starting points that are detected from the image of FIG. 4A.
Figure 4C:
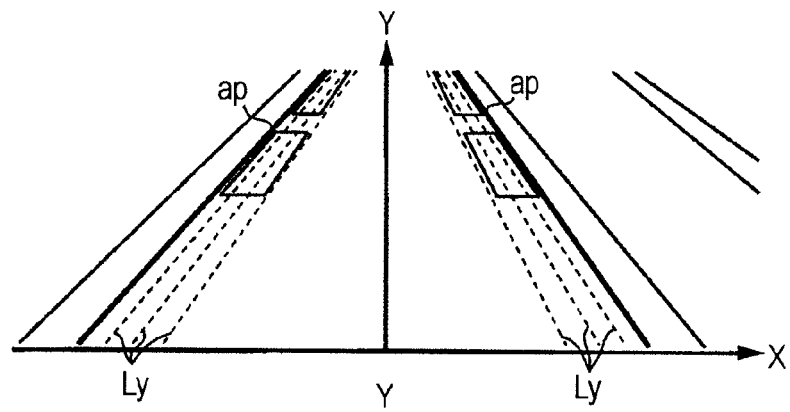
FIG. 4C is an illustrative view showing white road line search lines for detecting a double white road line.
Figure 4D:
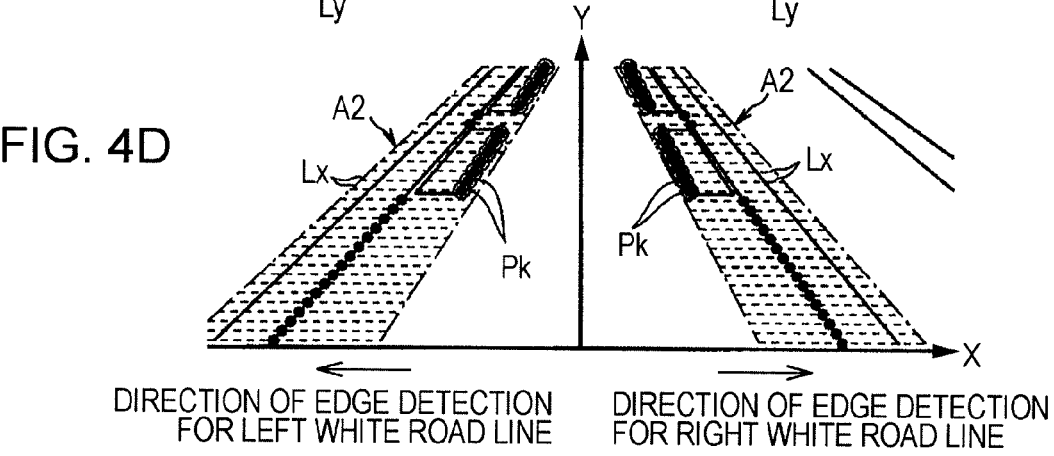
FIG. 4D is an illustrative view showing a second point group containing white road line starting points that are detected from the image of FIG. 4A.
Figure 5A:
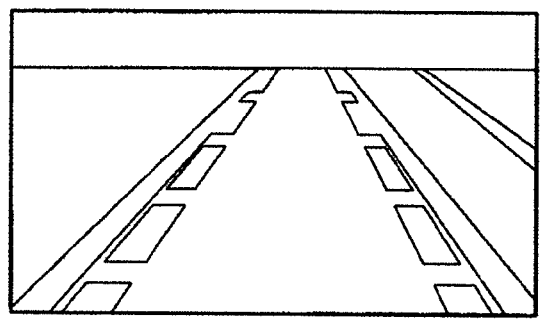
FIG. 5A is an illustrative view showing a frame format of a captured image of a vehicle exterior environment.
Figure 5B:
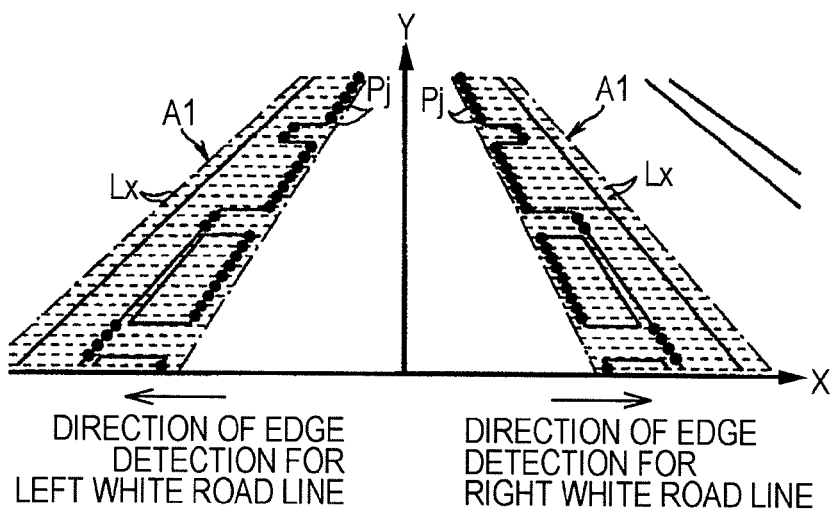
FIG. 5B is an illustrative view showing a first point group containing white road line starting points that are detected from the image of FIG. 5A.
Figure 5C:
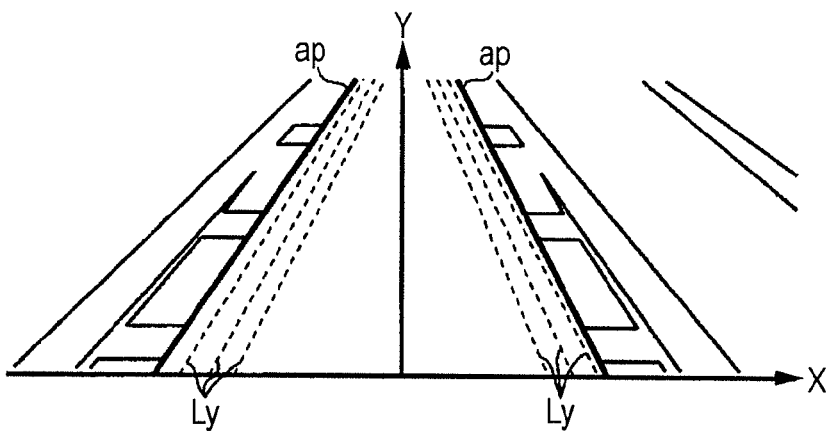
FIG. 5C is an illustrative view showing white road line search lines for detecting a double white road line.
Figure 6:
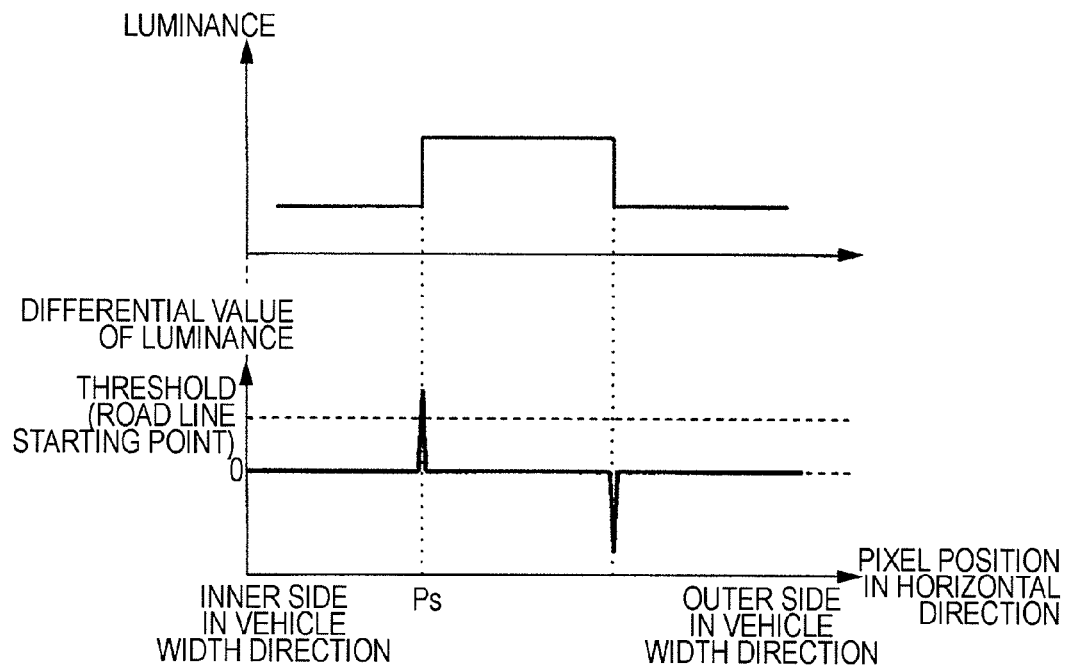
FIG. 6 is a diagram showing a transition of luminance and differential value thereof at a white road line starting point and a white road line ending point.
Figure 7:
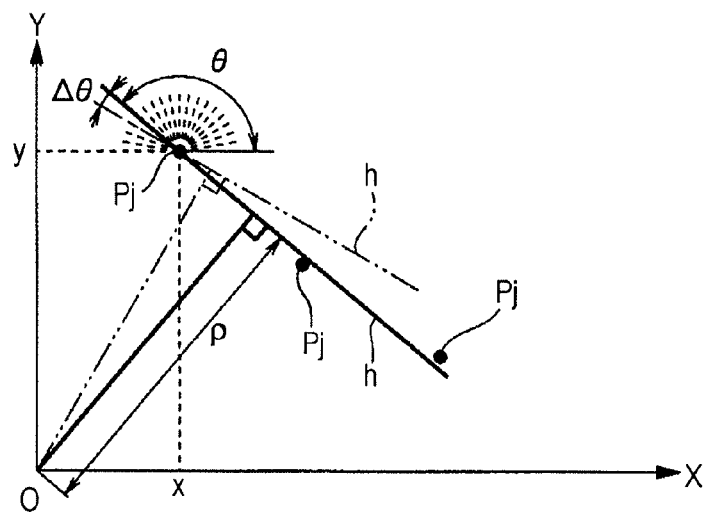
FIG. 7 is an illustrative view showing a calculation method of a Hough transform.
Figure 8:
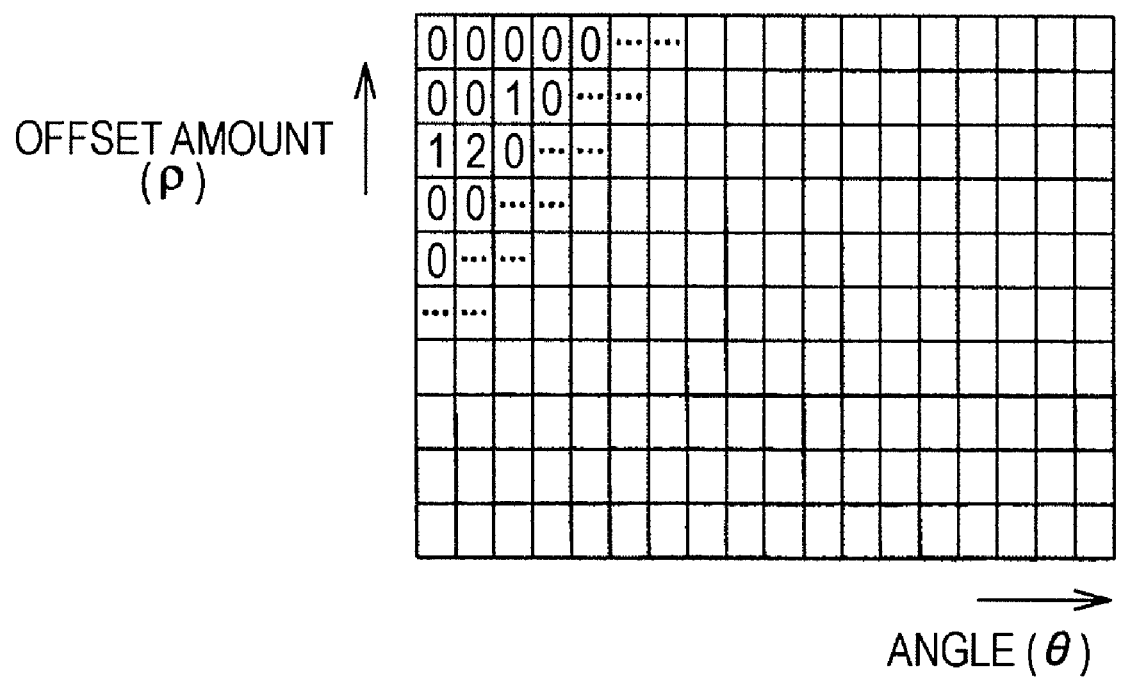
FIG. 8 is an illustrative view showing a Hough space.
Figure 10A:
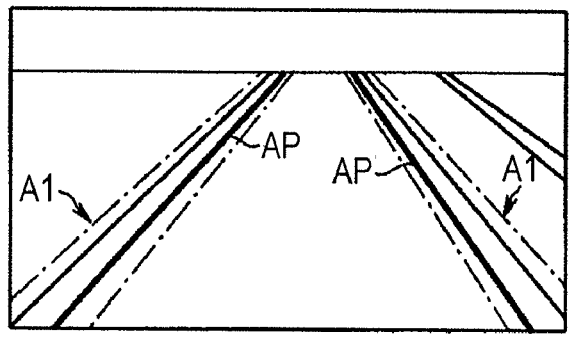
FIG. 10A and FIG. 10 B are an illustrative view showing the relationship between a recognized white road line and the first white road line detection region.
Figure 10B:
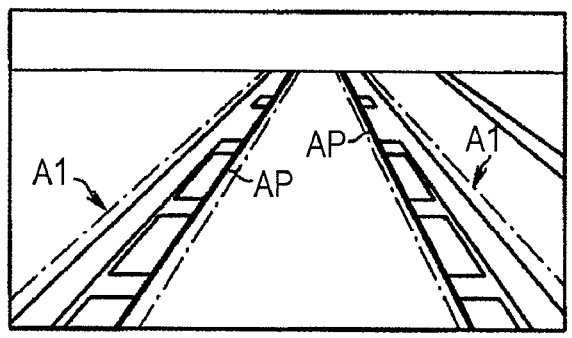
Figure 11:
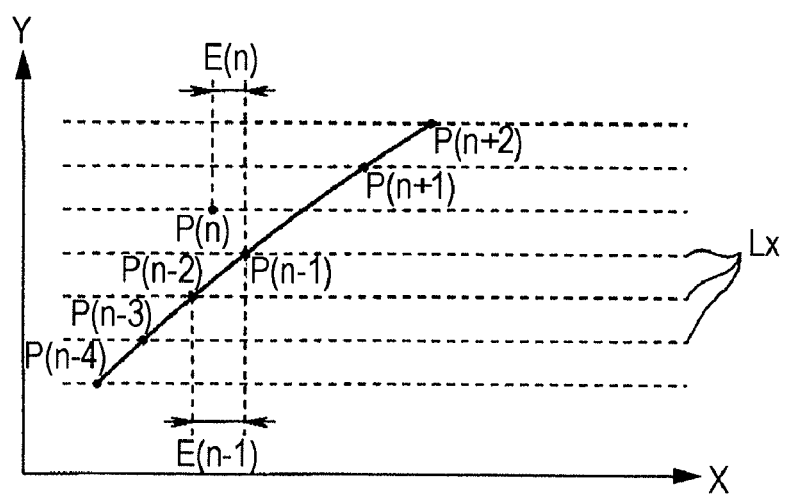
FIG. 11 is an illustrative view showing a modification of a point group selecting method.

An embodiment of the present invention will hereunder be described with reference to the drawings. FIG. 1 is a general schematic view illustrating a driving support device for vehicles according to an embodiment of the present invention; FIG. 2 is a flow chart showing a routine of white road line recognition; FIG. 3A is an illustrative view showing a frame format of a captured image of a vehicle exterior environment, FIG. 3B is an illustrative view showing a first point group containing white road line starting points that are detected from the image of FIG. 3A, and FIG. 3C is an illustrative view showing a white road line search line for detecting a double white road line; FIG. 4A is an illustrative view showing a frame format of a captured image of a vehicle exterior environment, FIG. 4B is an illustrative view showing a first point group containing white road line starting points that are detected from the image of FIG. 4A, and FIG. 4C is an illustrative view showing white road line search lines for detecting a double white road line, and FIG. 4D is an illustrative view showing a second point group containing white road line starting points that are detected from the image of FIG. 4A; FIG. 5A is an illustrative view showing a frame format of a captured image of a vehicle exterior environment, FIG. 5B is an illustrative view showing a first point group containing white road line starting points that are detected from the image of FIG. 5A, and FIG. 5C is an illustrative view showing white road line search lines for detecting a double white road line; FIG. 6 is a diagram showing a transition of luminance and differential value thereof at a white road line starting point and a white road line ending point; FIG. 7 is an illustrative view showing a calculation method of a Hough transform; FIG. 8 is an illustrative view showing a Hough space; FIG. 9A through FIG. 9C are an illustrative view showing luminance on the white road line search lines on each captured image; FIG. 10A and FIG. 10 B are an illustrative view showing the relationship between a recognized white road line and the first white road line detection region; and FIG. 11 is an illustrative view showing a modification of a point group selecting method.

In FIG. 1, reference numeral 1 denotes a vehicle (own vehicle), on which a driving support device 2 is mounted. The driving support device 2 is mainly composed of a stereo camera 3, a stereo image recognition device 4, and a control unit 5, for example.

The own vehicle 1 is provided with a vehicle speed sensor 11 detecting an own vehicle speed V, a yaw rate sensor 12 detecting a yaw rate γ, a main switch 13 switching on and off a driving control function, a steering angle sensor 14 which is installed in pairs with a steering shaft connected a steering wheel and detects a steering angle θst, and an accelerator opening sensor 15 detecting a depression amount of an accelerator pedal by a driver (accelerator opening amount) θacc.

The stereo camera 3 is comprised of a pair of CCD cameras that utilize a solid-state imaging device such as charge-coupled device (CCD) for a stereo optical system. The right and left CCD cameras are mounted in a front ceiling of the own vehicle's compartment with a certain spacing, capture a stereo image of an object outside the own vehicle from different viewpoints, and output image data to a stereo image recognition device 4. In a following explanation, one image of a pair of captured stereo images (right image, for example) will be referred to as a reference image, whereas the other image (left image, for example) will be referred to as a comparison image. The stereo image recognition device 4 firstly divides the reference image into small regions of, for example, 4×4 pixels, and compares the reference image and the comparison image in terms of a luminance or color pattern of each small region in order to find a corresponding region, and obtains a distance distribution over the entire reference image. Further, the stereo image recognition device 4 determines a luminance difference between each pixel of the reference image with adjacent pixels thereof, extracts a luminance difference exceeding a threshold as an edge, and gives distance information to the extracted pixels (edges) to generate a distribution image of the edges having distance information (distance image). Then, based on the generated distance image, the stereo image recognition device 4 assigns a different identification to a white road line, a side wall, and a three-dimensional object and the like in front of the own vehicle and monitors them according to the identification continuously among frames.

In the present embodiment, the white road line is a generic name for lines that extend along on a road for separating an own lane such as a single lane division line and a multiple line that has a visual guidance line inside the lane division line (double line, etc.). The form of each line may be a solid line or a dashed line, and further, each line may be yellow, Bott's dots, etc. Moreover, upon white road line recognition according to the present embodiment, even when an actual white road line is a double white line, both right and left lines are respectively recognized by being approximated to a single straight line, a single curved line, etc.

Upon white road line recognition of this type, the stereo image recognition device 4 sets a plurality of retrieval lines Lx in the horizontal direction (vehicle width direction) in a first white road line detection region A1 that is set on an image based on a previous frame process, and, based on the change in luminance on the retrieval lines Lx, the stereo image recognition device 4 detects one first white road line starting point Pj for each retrieval line Lx. Specifically, for example, in each of the right and left first white road line detection regions A1 set in the reference image, the stereo image recognition device 4 detects a white road line starting point as the first white road line edge point (first white road line starting point Pj) by examining the change in luminance of every pixel on each retrieval line Lx from the inner side to the outer side in the vehicle width direction.

Further, in each of the right and left first white road line detection regions A1, the stereo image recognition device 4 calculates an approximation line ap for the point group containing the recognized first white road line starting points Pj.

Moreover, the stereo image recognition device 4 sets white road line search lines Ly that extend along the calculated approximation line on the inner side thereof in the vehicle width direction.

Then, based on luminance information on the white road line search lines Ly, the stereo image recognition device 4 searches whether or not there is another white road line on the inner side of the approximation line ap in the vehicle width direction.

When it is determined that there is another white road line on the inner side of the approximation line ap in the vehicle width direction, the stereo image recognition device 4 sets a second white road line detection region A2 whose region on the inner side in the vehicle width direction is expanded compared to the first white road line detection region A1.

Then, based on the change in luminance on the retrieval lines Lx, the stereo image recognition device 4 detects a white road line starting point as the second white road line edge point (second white road line starting point Pk) for each retrieval line Lx. Specifically, for example, in the second white road line detection region A2 the stereo image recognition device 4 detects one white road line starting point on each retrieval line Lx and extracts among the detected points a point which doest not overlap the first white road line starting point as a second white road line starting point Pk.

Then, the stereo image recognition device 4 selects a point group suitable for white road line calculation from a point group containing the first white road line starting points Pj or a point group containing the second white road line starting points Pk based on a predetermined condition and calculates a white road line (approximation line of the white road line) based on the selected point group. Note that when there is no point group containing the second white road line points Pk, the point group containing the first white road line points Pj is automatically selected for white road line calculation.

Furthermore, based on the calculated white road line, the stereo image recognition device 4 newly sets a first white road line detection region A1 that is used for the white road line recognition in a next frame.

As described above, in the present embodiment, the stereo image recognition device 4 has a function as a white road line recognition device and provides functions of first edge detecting means, approximation line calculation means, white road line searching means, second detection region setting means, first edge detecting means, white road line calculation means, and first detection region setting means.

Information on driving environment in front of the own vehicle 1 recognized by the stereo image recognition device 4 is input to the control unit 5. In addition, the own vehicle speed V from the vehicle speed sensor 11, the yaw rate γ from the yaw rate sensor 12 and the like are input to the control unit 5 as driving information of the own vehicle 1, and an operation signal from the main switch 13, the steering angle θst from the steering angle sensor 14 and the accelerator opening amount θacc from the accelerator opening sensor 15 and the like are input to the control unit 5 as information on an operation by the driver.

Then, for example, when an execution of an Adaptive Cruise Control (ACC) function, which is one of driving support control functions, is instructed through the operation of the main switch 13 by the driver, the control unit 15 reads a direction of a preceding vehicle recognized by the stereo camera recognition device 4 so as to identify whether or not there is a preceding vehicle to follow on a driving route of the own vehicle.

As a result, when a preceding vehicle to follow is not detected, constant-speed driving control is executed through opening and closing control of a throttle valve 16 (engine output control) so as to maintain the speed of the own vehicle 1, V at a set vehicle speed set by the driver.

On the other hand, when a preceding vehicle to follow is detected and the speed of the preceding vehicle is equal to or higher than the set vehicle speed, vehicle following control is executed wherein the own vehicle follows the preceding vehicle with an inter-vehicle distance from the preceding vehicle converged to a target inter-vehicle distance. During this vehicle following control, the control unit 5 converges the inter-vehicle distance from the preceding vehicle to the target inter-vehicle basically through opening and closing control of the throttle valve 16 (engine output control). Furthermore, when the control unit 5 determines that sufficient speed reduction is not achieved by the control of the throttle valve 16 only, the control unit 5 uses in combination control of an output fluid pressure from an active booster 17 (automatic braking intervention) to converge the inter-vehicle distance to the target inter-vehicle distance.

In addition, when an execution of a lane deviation prevention function, which is one of driving support control functions, is instructed through the main switch 13 operated by the driver, the control unit 15, for example, sets a warning determination line based on right and left white road lines, which define the own lane, and estimates a driving route of the own vehicle based on the speed V and yaw rate γ of the own vehicle 1. Then, for example, when the control unit 5 determines that the driving route of the own vehicle crosses either of the right and left warning determination lines within a set front distance of the own vehicle (10-16 m, for example), the control unit 5 determines that the own vehicle 1 is highly likely to deviate from the current own lane, and makes a lane deviation warning.

Next, white road line recognition performed by the above-mentioned stereo image recognition device 4 will be described with reference to the flow chart for a routine of white road line recognition shown in FIG. 2.

When this routine begins, in step S101, the stereo image recognition device 4 firstly performs the detection of the first white road line starting point, Pj. Specifically, the stereo image recognition device 4 reads the first white road line detection region A1 that is set in a previous frame, and detects the first white road line starting point Pj in the first white road line detection region A1, by, for example, edge detection on each retrieval line Lx from the inner side to the outer side in the vehicle width direction, which is based on a center line of the image (or a direction of movement of the own vehicle that is estimated according to the steering angle θst or the like). More specifically, as shown in FIG. 6, for example, upon the search from the inner side to the outer side in the vehicle width direction, the stereo image recognition device 4 detects an edge point on each retrieval line Lx, the point wherein the luminance of a pixel on the outer side in the vehicle width direction firstly becomes relatively higher than the luminance of a pixel on the inner side and a differential value of the luminance, which shows an amount of change thereof, is equal to or positively exceeds a set threshold, and recognizes the detected point as the first white road line starting point, Pj.

By this search, for example, when a white road line to be recognized is a single white road line composed of a lane division line (see FIG. 3A) and the entire lane division line is present within the first white road line detection region A1 (see FIG. 3B), most of the first white road line stating points Pj recognized on both right and left sides of the own vehicle are arranged continuously in the extending direction of the lane division lines (see FIG. 3B).

For another example, when there is a lane division line to be recognized, and further, in a far distance of the own vehicle there are visual guidance lines disposed as a certain interval (see FIG. 4A) and the entire lane division line is present mainly within the first white road line detection region A1 (see FIG. 4B), almost all the first white road line stating points Pj recognized on both right and left sides of the own vehicle are arranged continuously along the lane division lines (see FIG. 4B).

For another example, when a white road line to be recognized is a double white road line composed of a lane division line and visual guidance lines disposed inside the lane division line (See FIG. 5A) and the entire lane division line and visual guidance lines are present within the first white road line detection region A1 (See FIG. 5B), almost all the first white road line stating points Pj recognized on both right and left sides of the own vehicle are arranged continuously along the lane division lines (see FIG. 5B).

Then, in step S102, the stereo image recognition device 4 uses a Hough transform for example, and calculates an approximation line ap of a point group containing the detected first white road line starting points Pj. Specifically, as shown in FIG. 7 for example, for each point Pj constituting the point group, the stereo image recognition device 4 changes the slope θ of a straight line h that passes the point Pj from 0 degree to 180 degrees by a predetermined angle Δθ and obtains a distance ρ from the origin O to the straight line h (length of a perpendicular) for each θ according to the following expression (1)

$$\rho = x \cdot \cos\theta + y \cdot \sin\theta \quad (1)$$

Then the stereo image recognition device 4, votes (projects) the obtained relationship between θ and ρ of each point Pj to a corresponding point on a Hough plane (θ, ρ) shown in FIG. 8 as frequency, for example. Furthermore, the stereo image recognition device 4 extracts a combination of θ and ρ that has the largest frequency on the Hough plane (θ, ρ), and sets the straight line defined by the expression (1) with the extracted θ and ρ (Hough straight line) as an approximation formula for the point group (See FIGS. 3C, 4C and 5C). Note that as θ and ρ for determining the Hough line, a filtering result of previous θ and ρ may be used.

Then, in step S103, the stereo image recognition device 4 sets white road line search lines Ly based on the calculated approximation line ap. Specifically, on the inner side of the approximation line in the vehicle width direction, the stereo image recognition device 4 sets a plurality of white road line search lines Ly (for example, three lines) that are parallel to the approximation line ap in real space at a predetermined interval th (see FIGS. 3C, 4C and 5C). Note that the interval th is set narrower than a typical white road line width. In addition, the sum of the intervals th is set, for example, wider than a distance between the inner borders of the inner and outer lines of a typical double white road line drawn on roads.

When the routine moves from step S103 to step S104, the stereo image recognition device 4 searches a white road line by evaluating luminance on the white road line search lines Ly. Specifically, when there is another line inside the approximation line ap in the vehicle width direction, luminance substantially changes on at least one of the white road line search lines Ly or among the white road line search lines Ly. Therefore, the stereo image recognition device 4 performs the evaluation of luminance on the white road line search lines Ly (detection of an edge point and the like) to search whether or not there is another line inside the approximation line ap in the vehicle width direction (whether or not there is a visual guidance line inside a lane division line in the vehicle direction). In the present embodiment, luminance at the center front of the own vehicle (on Y-axis) is also evaluated in order to avoid an erroneous decision due to a luminance change of a marking other than a white road line (for example, speed-limit sign)

For example, luminance on the white road line search lines Ly set on the right side and luminance at the center front of the own vehicle (Y axis) in FIG. 3C is overall small (dark), as shown in FIG. 9A. In this case, the stereo image recognition device 4 determines that there is not another white road line inside the approximation line ap in the vehicle width direction.

For another example, regarding luminance on the white road line search lines Ly set on the right side and luminance at the center front of the own vehicle (Y axis) in FIG. 4C, there is a high-luminance portion on two white road line search lines Ly, as shown in FIG. 9b. In this case, the stereo image recognition device 4 determines that there is another white road line inside the approximation line ap in the vehicle width direction and the width thereof is approximately 2×th to 3×th.

For another example, luminance on the white road line search lines Ly set on the right side and luminance at the center front of the own vehicle (Y axis) in FIG. 5C is overall small (dark), as shown in FIG. 9C. In this case, the stereo image recognition device 4 determines that there is not another white road line inside the approximation line ap in the vehicle width direction.

Then, when the routine moves to step S105, the stereo image recognition device 4 checks whether a white road line has been detected inside the approximation line ap in the vehicle width direction in step S104. When the stereo image recognition device 4 determines that there has been no white road line detected, the stereo image recognition device 4 sets (selects) the point group containing the first white road line starting points Pj as a point group for white road line calculation, and moves to step S106.

When the routine moves to step S106, the stereo image recognition device 4 sets the second white road line detection region A2. Specifically, for example, the stereo image recognition device 4 sets the second white road line detection region A2 by expanding the first white road line detection region A1 to the further inner side in the vehicle width direction than a region where there is assumed to be the white road line detected in step S104.

Then in step S107, the stereo image recognition device 4 performs the detection of a second white road line starting point, Pk. Specifically, the stereo image recognition device 4 performs the detection of the second white road line starting point Pk in the second white road line detection region A2 by, for example, edge detection on the retrieval lines Lx from the inner side to the outer side in the vehicle width direction. More specifically, as shown in FIG. 6, for example, upon the search from the inner side to the outer side in the vehicle width direction, the stereo image recognition device 4 detects an edge point on each retrieval line Lx, the point wherein the luminance of a pixel on the outer side in the vehicle width direction firstly becomes relatively higher than the luminance of a pixel on the inner side and a differential value of the luminance, which shows an amount of change thereof, is equal to or positively exceeds a set threshold. Then, among the detected points, the stereo image recognition device 4 recognizes a point that does not overlap the first white road line starting point Pj as the second white road line starting point, Pk.

With this procedure, for an example shown in FIG. 4D, as indicated by a double circle, almost all the second white road line starting points Pk are arranged continuously along a visual guidance lane. Note that black circles are edge points detected on the retrieval lines Lx and overlap the first white road starting points Pj.

When routine moves from step S107 to step S108, the stereo image recognition device 4 assess the credibility of the point groups respectively containing the first white road line starting points Pj and the second white road line starting points Pk detected in step S101 and selects the point group which is determined to have a higher credibility for white road line calculation.

In this case, for example, between the point groups containing the first white road line starting points Pj and the second white road line starting points Pk, the point group having a larger number of white road line points may be determined to have a higher credibility and selected for white road line calculation.

Alternatively, it is possible to perform approximation line calculation using a Hough transform, which is performed in step S102, also for the point group containing the second white road line stating points Pk, calculates an average of errors of the points to the obtained approximation line for each point group, determines the point group with a smaller error average as a point group with a higher credibility, and selects the point group for white road line calculation. In addition, the point group that has the larger peak of the frequencies on the Hough plane may determined as a point group with a higher credibility and be selected for white road line calculation.

When the routine moves from step S105 or step S108 to step S109, the stereo image recognition device 4 performs white road line calculation based on the selected point group. In this case, for example, the stereo image recognition device 4 can automatically recognize the approximation line obtained by the Hough transform as an approximation line expressing the white road line, AP. Then the routine moves from step 109 to step 110 and the stereo image recognition device 4 sets a white road line detection region A1 to be used in a next frame based on the white road line (approximation line AP) calculated in step S109, and the routine ends.

Specifically, the stereo image recognition device 4 sets a new first road line detection region A1 by variably setting a region mainly on the inner side in the vehicle direction for a currently-set first road line detection region A1. For example, in FIGS. 10A and 10B, regions surrounded with long dashed short dashed lines are first white road line detection regions A1 to be newly set, and the boundaries thereof are set at positions offset to the further inner side by a predetermined width than the approximation line AP of the currently-recognized white road line. In this case, the offset amount is suitably set to approximately a half value of the width of a typical white road line (singe line). In particular, when the width of the white road line is estimated based on the white road line search lines Ly in step S104, approximately a half value of the estimated width is suitably set.

According to this embodiment, even in case of a double white road line and the like, a highly-precise and stable recognition result can be obtained with a fast calculation process by the following: a first white road line starting points Pj is detected based on the change in luminance of retrieval lines Lx horizontally set within a first white road line detection region A1 set on an image, an approximation line ap of the point group containing the first white road line starting points Pj is calculated and white road line search lines Ly are set that extend along the approximation line ap on the inner side of the thereof in the vehicle width direction, and a white road line is searched on the inner side of the approximation line ap in the vehicle width direction based on the luminance information on the white road line search lines Ly. When there is determined to be a white road line, a second white road line detection region A2 is set by expanding the first white road line detection region A1 to the inner side in the vehicle width direction. Then, among the white road starting points detected based on the luminance change on retrieval lines Lx set within the second white road line detection region A2, a point that does not overlap of the first white road line starting point Pj is set a second white road line starting point Pk. Then the white road line (approximation line AP) is calculated based on a point group selected based on a predetermined condition between the point group containing the first white road line starting points Pj and the point group containing the second white road line starting points Pk, and a white road line detection region A1 is set based on the calculated white road.

More specifically, a white road line starting point can be efficiently detected within a limited region by the following: only one starting point Pj is detected on each retrieval line Lx based on the edge detection from the inner side to the outer side in a first white road line detection region A1 which is set based on a white road line (approximation line AP) recognized previously (in a previous frame). Further, even in a case in which, for example, a white road line changes its configuration from a single line to a double white road line or the like in a far distance of the own vehicle, a new white road line starting point constituting the double white road line can be accurately detected by the following: an approximation line ap is calculated that approximates the point group containing the first white road line starting points and white road line search lines Ly are set that extend along the approximation line ap on the inner side in the vehicle width direction. The presence of a white road line on the inner side of the approximation line ap in the vehicle direction is determined based on the luminance information on the white road line search lines Ly. When there is determined to be a white road line, a second white road line starting point Pk that does not overlap the first white road line starting point Pj is detected within a second white road line detection region A2 that is set by expanding the first white road line detection region A1 to the inner side in the vehicle width detection. Furthermore, suitable white road line recognition can also be performed for a case in which the number of lines constituting a white road line changes (for example, a single white road line changes to a double white road line, and a double white road line changes to a triple white road line) by the following: a suitable point group is selected between a point group containing first white road line starting points Pj and a point group containing second white road line starting points Pk based on a predetermined condition for white road line calculation and white road line calculation is performed based on the selected point group. Then, in white road line calculation in a next frame, the detection of a first white road line starting point Pj is can be performed based on a most-suitably recognized white road line on the inner side in the vehicle width direction by setting a new first white road line detection region A1 based on the recognized white road line. Of course in a case where the number of lines constituting a white road line decreases such that, for example, a double white road line changes to a single white road line, the detection of the white road line starting points Pj and the like is efficiently achieved since the first white road line detection region A1 becomes limited for a reason that the positions of the first white road line starting points Pj detected in the first white road line detection region A1 are overall shifted on the outer side in the vehicle width detection.

Here, the calculation methods in step S102, S108 and S109 are not limited to the Hough transform, but a least-square method may be used. In this case, for, example, point groups are approximated with a quadratic expression ($y = a \cdot x2 + b \cdot x + c$), and a calculation using the approximation lines (approximation curves) may be performed. With this, for example, in the process of step s108, a point group that has a smaller variation or a larger correlation coefficient as to its approximation curve on the image or in real space can be selected. This technique dramatically reduces the calculation load for point group selection and the like, compared to the process using the Hough transform.

Furthermore, instead of point group selection using the Hough transform, a dispersion of a point group may be evaluated based on the displacement for back and forth shifting in the vehicle width direction of points constituting the point group. In this case, as shown in FIG. 11 for example, regarding a point P(n), a point P(n−2) on a retrieval line Lx, which is two-line ahead of the line where the point P(n) is located (closer to the own vehicle by two lines), and a point P(n−1) on a retrieval line Lx, which is one-line ahead of the line where the point P(n) is located (closer to the own vehicle by one line) are considered. An amount of change along the X axis between the point P(n−2) and the point P(n−1) on the image, E(n−1), is compared with an amount of change along the X axis between the point P(n−1) and the point P(n), E(n). If the signs of the amounts of change E(n−1) and E(n) are different, the corresponding amount of change E(n) is extracted, integrated as the deviation of the point group, and then divided by the number of the points in the point group to obtain the average of the deviation. The averages of the deviation of the point groups obtained by the above calculation are compared and the point group with a smaller average of deviation can be selected as the point group with a smaller dispersion.

In the embodiment described above, the description is made for a case where the white road line starting point is used as the white road line edge point, but the present invention is not limited to this: for example, the white road line ending point where luminance changes from light to dark can be used instead of the white road line starting point.

Moreover, in the above embodiment, the description is made for a case where white road line recognition is performed based on a pair of captured stereo images, but the present invention is not limited to this, and of course white road line recognition may be performed based on an image captured by a monocular camera.

What is claimed is:

1. A white road line recognition device for vehicles comprising:
    first edge detecting means that detects first edge point points in a first white road line detection region set on a captured image of a driving environment of an own vehicle, based on a change in luminance in the horizontal direction;
    approximation line calculation means that calculates an approximation line of a point group containing the first edge points;
    white road line searching means that sets a white road line search line along the approximation line on the inner side of the approximation line in the vehicle width direction and searches for a white road line on the inner side of the approximation line in the vehicle width direction based on luminance information on the white road line search line;
    second detection region setting means that sets a second white road line detection region by expanding the first white road line detection region to the inner side in the vehicle width direction when it is determined that there is a white road line inside the approximation line in the vehicle width direction;
    second edge point detecting means that detects points which do not overlap the first edge points among the white road line edge points detected in the second white road line detection region based on a change in luminance in the horizontal direction;
    white road line calculating means that selects either a point group containing the first white road line edge points or a point group containing the second white road line edge points based on a predetermined condition, and calculates a white road line based on the selected point group; and
    first detection region setting means that sets the first white road line detection region based on the calculated white road line.

2. The white road line recognition device for vehicles according to claim 1, wherein a straight-line approximation is performed using a Hough transform to the point group containing the first edge points and the point group containing the second points, and the point group that has a larger peak of the frequencies on a Hough plane is selected.

3. The white road line recognition device for a vehicle according to claim 1, wherein a straight-line approximation is performed using a Hough transform to the point group containing the first edge points and the point group containing the second points, and the point group with a smaller average of errors of the points to the obtained approximation line is selected.

4. The white road line recognition device for vehicles according to claim 1, wherein the point group selecting means selects the point group with a smaller dispersion based on the displacement for back and forth shifting in the vehicle width direction of points composing the point group.

5. The white road line recognition device for a vehicle according to claim 1, wherein the point group selecting means obtains an approximation formula which expresses the point groups using a least-square method, and selects the point group with a smaller variation, or the point group with a larger correlation coefficient.

* * * * *